United States Patent [19]

Kaneko et al.

[11] Patent Number: 5,729,109
[45] Date of Patent: Mar. 17, 1998

[54] NAVIGATION SYSTEM AND INTERSECTION GUIDANCE METHOD

[75] Inventors: Shigehiko Kaneko, Kasuya-gun; Akitoshi Aritaka, Kasuga; Yuji Hirai, Fukuoka, all of Japan

[73] Assignee: Matsushita Electric Industrial Co., Ltd., Osaka, Japan

[21] Appl. No.: 679,399

[22] Filed: Jul. 9, 1996

[30] Foreign Application Priority Data

Jul. 19, 1995 [JP] Japan ................................. 7-182477

[51] Int. Cl.$^6$ ................................................ G09B 29/10
[52] U.S. Cl. .................... 318/587; 318/582; 364/449.3; 364/449.5; 364/449.6
[58] Field of Search ................................. 318/580, 582, 318/587; 364/443, 444.1, 444.2, 449.1–449.7

[56] References Cited

U.S. PATENT DOCUMENTS

| | | | |
|---|---|---|---|
| 4,677,450 | 6/1987 | Ito et al. | 364/449 |
| 4,677,562 | 6/1987 | Uota et al. | 364/449 |
| 4,758,959 | 7/1988 | Thoone et al. | 364/454 |
| 4,937,752 | 6/1990 | Nanba et al. | 364/449 |
| 4,937,753 | 6/1990 | Yamada | 364/449 |
| 5,452,217 | 9/1995 | Kishi et al. | 364/449 |

*Primary Examiner*—Bentsu Ro
*Attorney, Agent, or Firm*—Watson Cole Stevens Davis, P.L.L.C.

[57] ABSTRACT

A navigation system and a voice guidance method for carrying out a voice guidance of an intersection on a drive route when the user demands the voice guidance while a motor vehicle is running according to a preset drive route. In response to the output demand of the guidance information through an inputting unit, a control unit obtains a distance to the intersection and an advancing direction in the intersection and further reads out the corresponding sound data from a sound storing unit. This sound data is outputted through a speech synthesizing unit and a voice outputting unit.

46 Claims, 12 Drawing Sheets

FIG.4

| DATA NUMBER | DISTANCE TO INTERSECTION | ADVANCING DIRECTION | MESSAGE DATA |
|---|---|---|---|
| A-1 | 5100m OR MORE | | ALONG ROAD FOR A WHILE |
| B-1 | 4500m OR MORE BELOW 5100m | RIGHT | ABOUT 5 KILOMETERS AHEAD, RIGHT TURN |
| B-2 | 4500m OR MORE BELOW 5100m | LEFT | ABOUT 5 KILOMETERS AHEAD, LEFT TURN |
| B-3 | 4500m OR MORE BELOW 5100m | GREATLY RIGHT | ABOUT 5 KILOMETERS AHEAD, GREATLY RIGHT TURN |
| B-4 | 4500m OR MORE BELOW 5100m | GREATLY LEFT | ABOUT 5 KILOMETERS AHEAD, GREATLY LEFT TURN |
| B-5 | 4500m OR MORE BELOW 5100m | OBLIQUELY RIGHT | ABOUT 5 KILOMETERS AHEAD, OBLIQUELY RIGHT TURN |
| B-6 | 4500m OR MORE BELOW 5100m | OBLIQUELY LEFT | ABOUT 5 KILOMETERS AHEAD, OBLIQUELY LEFT TURN |
| C-1 | 3500m OR MORE BELOW 4500m | RIGHT | ABOUT 4 KILOMETERS AHEAD, RIGHT TURN |
| C-2 | 3500m OR MORE BELOW 4500m | LEFT | ABOUT 4 KILOMETERS AHEAD, LEFT TURN |
| C-3 | 3500m OR MORE BELOW 4500m | GREATLY RIGHT | ABOUT 4 KILOMETERS AHEAD, GREATLY RIGHT TURN |
| C-4 | 3500m OR MORE BELOW 4500m | GREATLY LEFT | ABOUT 4 KILOMETERS AHEAD, GREATLY LEFT TURN |
| C-5 | 3500m OR MORE BELOW 4500m | OBLIQUELY RIGHT | ABOUT 4 KILOMETERS AHEAD, OBLIQUELY RIGHT TURN |
| C-6 | 3500m OR MORE BELOW 4500m | OBLIQUELY LEFT | ABOUT 4 KILOMETERS AHEAD, OBLIQUELY LEFT TURN |
| D-1 | 2500m OR MORE BELOW 3500m | RIGHT | ABOUT 3 KILOMETERS AHEAD, RIGHT TURN |
| D-2 | 2500m OR MORE BELOW 3500m | LEFT | ABOUT 3 KILOMETERS AHEAD, LEFT TURN |
| D-3 | 2500m OR MORE BELOW 3500m | GREATLY RIGHT | ABOUT 3 KILOMETERS AHEAD, GREATLY RIGHT TURN |

FIG.5

| DATA NUMBER | DISTANCE TO INTERSECTION | ADVANCING DIRECTION | MESSAGE DATA |
|---|---|---|---|
| D-4 | 2500m OR MORE BELOW 3500m | GREATLY LEFT | ABOUT 3 KILOMETERS AHEAD, GREATLY LEFT TURN |
| D-5 | 2500m OR MORE BELOW 3500m | OBLIQUELY RIGHT | ABOUT 3 KILOMETERS AHEAD, OBLIQUELY RIGHT TURN |
| D-6 | 2500m OR MORE BELOW 3500m | OBLIQUELY LEFT | ABOUT 3 KILOMETERS AHEAD, OBLIQUELY LEFT TURN |
| E-1 | 1500m OR MORE BELOW 2500m | RIGHT | ABOUT 2 KILOMETERS AHEAD, RIGHT TURN |
| E-2 | 1500m OR MORE BELOW 2500m | LEFT | ABOUT 2 KILOMETERS AHEAD, LEFT TURN |
| E-3 | 1500m OR MORE BELOW 2500m | GREATLY RIGHT | ABOUT 2 KILOMETERS AHEAD, GREATLY RIGHT TURN |
| E-4 | 1500m OR MORE BELOW 2500m | GREATLY LEFT | ABOUT 2 KILOMETERS AHEAD, GREATLY LEFT TURN |
| E-5 | 1500m OR MORE BELOW 2500m | OBLIQUELY RIGHT | ABOUT 2 KILOMETERS AHEAD, OBLIQUELY RIGHT TURN |
| E-6 | 1500m OR MORE BELOW 2500m | OBLIQUELY LEFT | ABOUT 2 KILOMETERS AHEAD, OBLIQUELY LEFT TURN |
| F-1 | 800m OR MORE BELOW 1500m | RIGHT | ABOUT 1 KILOMETERS AHEAD, RIGHT TURN |
| F-2 | 800m OR MORE BELOW 1500m | LEFT | ABOUT 1 KILOMETERS AHEAD, LEFT TURN |
| F-3 | 800m OR MORE BELOW 1500m | GREATLY RIGHT | ABOUT 1 KILOMETERS AHEAD, GREATLY RIGHT TURN |
| F-4 | 800m OR MORE BELOW 1500m | GREATLY LEFT | ABOUT 1 KILOMETERS AHEAD, GREATLY LEFT TURN |
| F-5 | 800m OR MORE BELOW 1500m | OBLIQUELY RIGHT | ABOUT 1 KILOMETERS AHEAD, OBLIQUELY RIGHT TURN |
| F-6 | 800m OR MORE BELOW 1500m | OBLIQUELY LEFT | ABOUT 1 KILOMETERS AHEAD, OBLIQUELY LEFT TURN |
| G-1 | 600m OR MORE BELOW 800m | RIGHT | ABOUT 700m AHEAD, RIGHT TURN |

FIG.6

| DATA NUMBER | DISTANCE TO INTERSECTION | ADVANCING DIRECTION | MESSAGE DATA |
|---|---|---|---|
| G-2 | 600m OR MORE BELOW 800m | LEFT | ABOUT 700m AHEAD, LEFT TURN |
| G-3 | 600m OR MORE BELOW 800m | GREATLY RIGHT | ABOUT 700m AHEAD, GREATLY RIGHT TURN |
| G-4 | 600m OR MORE BELOW 800m | GREATLY LEFT | ABOUT 700m AHEAD, GREATLY LEFT TURN |
| G-5 | 600m OR MORE BELOW 800m | OBLIQUELY RIGHT | ABOUT 700m AHEAD, OBLIQUELY RIGHT TURN |
| G-6 | 600m OR MORE BELOW 800m | OBLIQUELY LEFT | ABOUT 700m AHEAD, OBLIQUELY LEFT TURN |
| H-1 | 450m OR MORE BELOW 600m | RIGHT | ABOUT 500m AHEAD, RIGHT TURN |
| H-2 | 450m OR MORE BELOW 600m | LEFT | ABOUT 500m AHEAD, LEFT TURN |
| H-3 | 450m OR MORE BELOW 600m | GREATLY RIGHT | ABOUT 500m AHEAD, GREATLY RIGHT TURN |
| H-4 | 450m OR MORE BELOW 600m | GREATLY LEFT | ABOUT 500m AHEAD, GREATLY LEFT TURN |
| H-5 | 450m OR MORE BELOW 600m | OBLIQUELY RIGHT | ABOUT 500m AHEAD, OBLIQUELY RIGHT TURN |
| H-6 | 450m OR MORE BELOW 600m | OBLIQUELY LEFT | ABOUT 500m AHEAD, OBLIQUELY LEFT TURN |
| I-1 | 350m OR MORE BELOW 450m | RIGHT | ABOUT 400m AHEAD, RIGHT TURN |
| I-2 | 350m OR MORE BELOW 450m | LEFT | ABOUT 400m AHEAD, LEFT TURN |
| I-3 | 350m OR MORE BELOW 450m | GREATLY RIGHT | ABOUT 400m AHEAD, GREATLY RIGHT TURN |
| I-4 | 350m OR MORE BELOW 450m | GREATLY LEFT | ABOUT 400m AHEAD, GREATLY LEFT TURN |
| I-5 | 350m OR MORE BELOW 450m | OBLIQUELY RIGHT | ABOUT 400m AHEAD, OBLIQUELY RIGHT TURN |

FIG.7

| DATA NUMBER | DISTANCE TO INTERSECTION | ADVANCING DIRECTION | MESSAGE DATA |
|---|---|---|---|
| I-6 | 350m OR MORE BELOW 450m | OBLIQUELY LEFT | ABOUT 400m AHEAD, OBLIQUELY LEFT TURN |
| J-1 | 250m OR MORE BELOW 350m | RIGHT | ABOUT 300m AHEAD, RIGHT TURN |
| J-2 | 250m OR MORE BELOW 350m | LEFT | ABOUT 300m AHEAD, LEFT TURN |
| J-3 | 250m OR MORE BELOW 350m | GREATLY RIGHT | ABOUT 300m AHEAD, GREATLY RIGHT TURN |
| J-4 | 250m OR MORE BELOW 350m | GREATLY LEFT | ABOUT 300m AHEAD, GREATLY LEFT TURN |
| J-5 | 250m OR MORE BELOW 350m | OBLIQUELY RIGHT | ABOUT 300m AHEAD, OBLIQUELY RIGHT TURN |
| J-6 | 250m OR MORE BELOW 350m | OBLIQUELY LEFT | ABOUT 300m AHEAD, OBLIQUELY LEFT TURN |
| K-1 | 150m OR MORE BELOW 250m | RIGHT | ABOUT 200m AHEAD, RIGHT TURN |
| K-2 | 150m OR MORE BELOW 250m | LEFT | ABOUT 200m AHEAD, LEFT TURN |
| K-3 | 150m OR MORE BELOW 250m | GREATLY RIGHT | ABOUT 200m AHEAD, GREATLY RIGHT TURN |
| K-4 | 150m OR MORE BELOW 250m | GREATLY LEFT | ABOUT 200m AHEAD, GREATLY LEFT TURN |
| K-5 | 150m OR MORE BELOW 250m | OBLIQUELY RIGHT | ABOUT 200m AHEAD, OBLIQUELY RIGHT TURN |
| K-6 | 150m OR MORE BELOW 250m | OBLIQUELY LEFT | ABOUT 200m AHEAD, OBLIQUELY LEFT TURN |
| L-1 | 75m OR MORE BELOW 150m | RIGHT | ABOUT 100m AHEAD, RIGHT TURN |
| L-2 | 75m OR MORE BELOW 150m | LEFT | ABOUT 100m AHEAD, LEFT TURN |
| L-3 | 75m OR MORE BELOW 150m | GREATLY RIGHT | ABOUT 100m AHEAD, GREATLY RIGHT TURN |

FIG.8

| DATA NUMBER | DISTANCE TO INTERSECTION | ADVANCING DIRECTION | MESSAGE DATA |
|---|---|---|---|
| L-4 | 75m OR MORE BELOW 150m | GREATLY LEFT | ABOUT 100m AHEAD, GREATLY LEFT TURN |
| L-5 | 75m OR MORE BELOW 150m | OBLIQUELY RIGHT | ABOUT 100m AHEAD, OBLIQUELY RIGHT TURN |
| L-6 | 75m OR MORE BELOW 150m | OBLIQUELY LEFT | ABOUT 100m AHEAD, OBLIQUELY LEFT TURN |
| M-1 | 45m OR MORE BELOW 75m | RIGHT | ABOUT 50m AHEAD, RIGHT TURN |
| M-2 | 45m OR MORE BELOW 75m | LEFT | ABOUT 50m AHEAD, LEFT TURN |
| M-3 | 45m OR MORE BELOW 75m | GREATLY RIGHT | ABOUT 50m AHEAD, GREATLY RIGHT TURN |
| M-4 | 45m OR MORE BELOW 75m | GREATLY LEFT | ABOUT 50m AHEAD, GREATLY LEFT TURN |
| M-5 | 45m OR MORE BELOW 75m | OBLIQUELY RIGHT | ABOUT 50m AHEAD, OBLIQUELY RIGHT TURN |
| M-6 | 45m OR MORE BELOW 75m | OBLIQUELY LEFT | ABOUT 50m AHEAD, OBLIQUELY LEFT TURN |
| N-1 | BELOW 45m | RIGHT | A LITTLE AHEAD, RIGHT TURN |
| N-2 | BELOW 45m | LEFT | A LITTLE AHEAD, LEFT TURN |
| N-3 | BELOW 45m | GREATLY RIGHT | A LITTLE AHEAD, GREATLY RIGHT TURN |
| N-4 | BELOW 45m | GREATLY LEFT | A LITTLE AHEAD, GREATLY LEFT TURN |
| N-5 | BELOW 45m | OBLIQUELY RIGHT | A LITTLE AHEAD, OBLIQUELY RIGHT TURN |
| N-6 | BELOW 45m | OBLIQUELY LEFT | A LITTLE AHEAD, OBLIQUELY LEFT TURN |

NAVIGATION SYSTEM AND INTERSECTION GUIDANCE METHOD

BACKGROUND OF THE INVENTION

1. Field of the Invention

The present invention relates to a navigation system and an intersection guidance method in which a measured current position of a motor vehicle and a preset drive route are superimposed on map data and displayed to give guidance information on intersections in which the advancing direction is changed on its drive route.

2. Description of the Prior Art

Recently, there has been an increasing demand for a navigation system for a motor vehicle which informs the user of the current position of the motor vehicle on map data in such a way that the motor vehicle positional information obtainable from a GPS (Global Positioning System) or the like is combined with map data stored in a memory such as an optical disk and an IC card and the composition is indicated on a display means such as a liquid crystal display (which will be referred hereinafter to as an LCD). In fact there have been known a variety of developed navigation systems.

In such navigation systems, a drive route from the starting point to the destination is set in advance on map data and in the actual drive the guidance is made for the driver to take a drive according to that drive route. For example, when the motor vehicle reaches a point at a given distance (for example, 300 m) before the intersection on the drive routes for the next change of its advancing direction, a voice guidance is automatically outputted to let the driver know of turning at the intersection.

However, since the aforesaid conventional arrangement is made such that the voice guidance is outputted only when the motor vehicle approaches a point at a given distance before the subsequent intersection for the change of its advancing direction, if, for instance, there is no intersection at which the driver is to change the advancing direction for a while, no output of the voice guidance occurs, which can make the user feel uneasy.

SUMMARY OF THE INVENTION

It is therefore an object of the present invention to provide a navigation system and an intersection guidance method which are capable of, when taking a drive according to a set drive route, giving guidance information on the intersection on the drive route for the next change of its advancing direction on the drive route in response to the demand of the guidance information from the user.

For this purpose, according to the present invention, the system is provided with position measuring means for measuring the position of a motor vehicle, map storing means for storing road map data, image display means for indicating an image signal including the road map data, sound storing means for storing guidance information on intersections as sound data, speech synthesizing means for performing a speech synthesizing process for the sound data to output a sound signal, voice outputting means for outputting the sound signal from the speech synthesizing means, inputting means for inputting various kinds of data from a user, route setting means for setting a drive route on the road map data on the basis of starting point information and destination information inputted through the inputting means, route storing means for storing the drive route set by the route setting means, and control means for, when the inputting means demands output of guidance information on an intersection on a drive route for the next change of its advancing direction (which will be referred hereinafter to as the first intersection) while the motor vehicle is running according to the drive route stored in the route storing means, retrieving the first intersection on the basis of the drive route to read out the corresponding sound data from the sound storing means to output the read sound data to the speech synthesizing means.

BRIEF DESCRIPTION OF THE DRAWINGS

The object and features of the present invention will become more readily apparent from the following detailed description of the preferred embodiments taken in conjunction with the accompanying drawings in which:

FIG. 4 illustrates a storage table of sound data according to the second embodiment of this invention;

FIG. 5 illustrates a storage table of sound data according to the second embodiment of this invention;

FIG. 6 illustrates a storage table of sound data according to the second embodiment of this invention;

FIG. 7 illustrates a storage table of sound data according to the second embodiment of this invention;

FIG. 8 illustrates a storage table of sound data according to the second embodiment of this invention;

DESCRIPTION OF THE PREFERRED EMBODIMENTS

Figure 1:
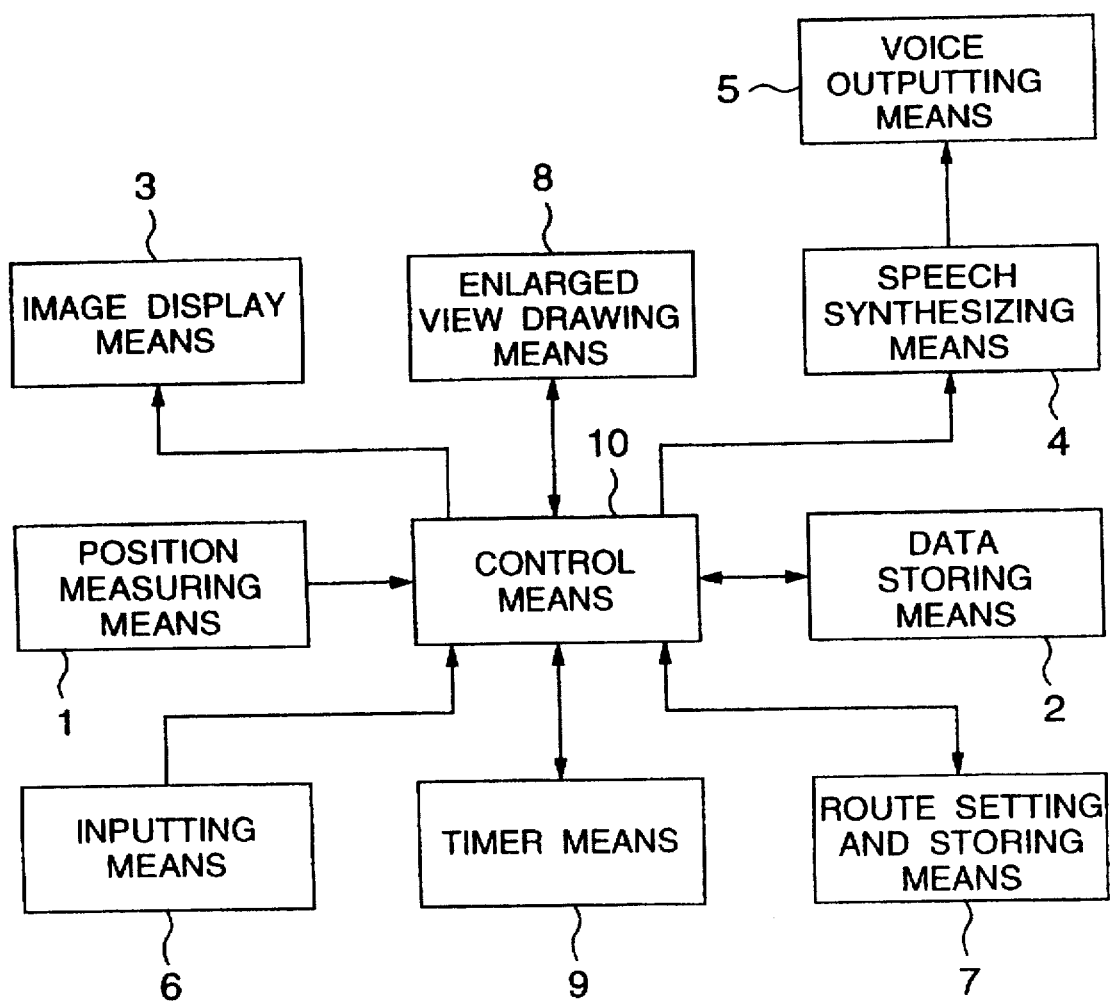
FIG. 1 is a block diagram showing one example of a structure of a navigation system according to the present invention.

A description will be made hereinbelow of embodiments of the present invention with reference to the drawings. FIG. 1 is a block diagram showing one example of a structure of a navigation system according to this invention. The description will begin with a structure of the navigation system. In FIG. 1, designated at numeral 1 is position measuring means which obtains the position of a motor vehicle by using a measuring method so-called satellite navigation or self-contained navigation. In the former satellite navigation is included, for example, a GPS receiver which simultaneously receives radio waves from a plurality of GPS satellites to obtain position measurement data such as an absolute position of a motor vehicle. On the other hand, in the latter self-contained navigation there is a system in which the travelling distance and travelling direction of a motor vehicle are calculated on the basis of physical quantities of the motor vehicle detected through a vehicle speed sensor, a gyrosensor, or the like and accumulated on the previous position of the motor vehicle to obtain the current position of the motor vehicle.

Furthermore, denoted at numeral 2 is data storing means where various data are stored in a recording medium such as CD-ROM (Compact Disk-Read Only Memory). The data storing means 2 stores road map data, indication data of point information (which will be referred hereinafter to as a landmark information) on marks such as buildings and institutions useful in taking a drive, position (coordinate) data corresponding to the map data and landmark information, sound data for voice guidance, and so on. Numeral 3 represents image display means for displaying an image signal such as map data for the user, where an LCD or the like is used as its display screen. Numeral 4 signifies speech synthesizing means for speech-synthesizing the sound data stored in the data storing means 2 to output a sound signal. Numeral 5 stands for voice outputting means for outputting as a voice the sound signal outputted from the speech synthesizing means 4.

Still further, depicted at numeral 6 is inputting means through which the user inputs various data, including the type that the user operates a keyboard, a touch panel or the like to give instructions and the type that recognizes the voice of the user to receive instructions. Particularly, the latter voice recognition inputting method is very useful in a safety point because of not affecting the user. Numeral 7 indicates route setting and storing means for setting and storing a drive route on a road map data on the basis of the starting point and destination inputted through the inputting means 6. Numeral 8 indicates enlarged view drawing means for making an enlarged illustration of an intersection on the basis of the road map data stored in the data storing means 2. Numeral 9 represents timer means for counting a predetermined time. Numeral 10 designates control means for controlling signals to be outputted from the above-mentioned respective means.

Secondly, a description will be taken hereinbelow of an operation of the navigation system thus arranged. In this structure, the route setting and storing means 7 sets and stores a drive route from the starting point to the destination in advance. Now that as ways of setting the drive route there have been known the prior art which sets it in such a manner that the distance between the starting point and the destination comes to a minimum or which preferentially selects the primary road, the detailed description will be omitted herein for brevity.

In response to the start-up of the system, the control means 10, on the basis of the position information on the motor vehicle outputted from the position measuring means 1, reads out only a certain area of the road map data from the data storing means 2 and then superimposes the motor vehicle position information on the read road map data to output them to the image display means 3. In this instance, the drive route, stored in the route setting and storing means 6, is further superimposed on the road map data and then outputted to the image display means 3.

Figure 2:
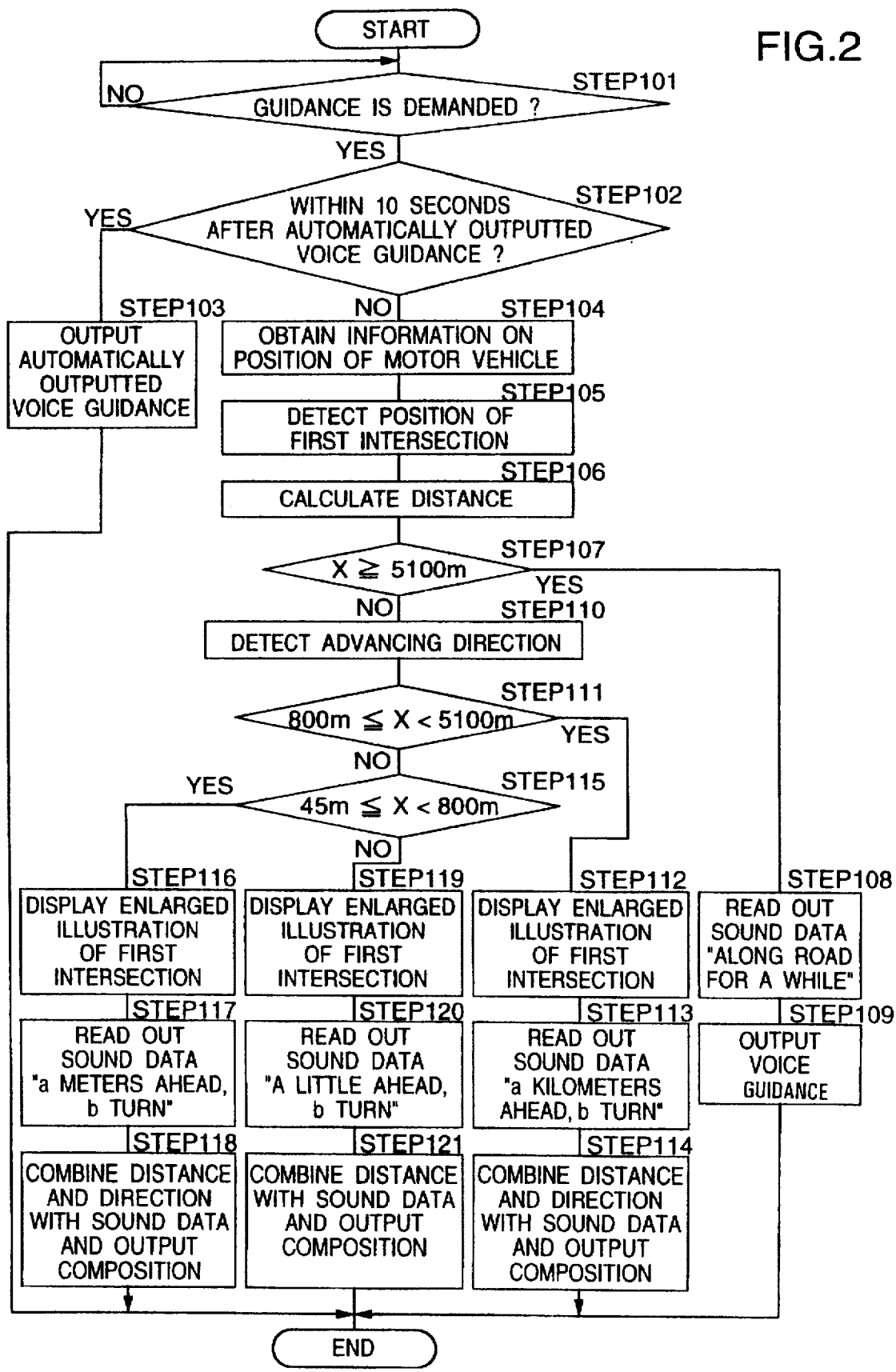
FIG. 2 is a flow chart showing an operation of a navigation system according to a first embodiment of this invention.

FIG. 2 is a flow chart of an operation of a navigation system according to the first embodiment of this invention, showing the operation of the voice guidance for an intersection at which the motor vehicle will next turn on the drive route for the change of its advancing direction (which intersection will be referred hereinafter to as a first intersection), with respect to the position of the motor vehicle at the time that the user requests the intersection guidance while taking a drive according to a preset drive route. Incidentally, in the following explanation concerning embodiments according to the present invention, it is premised that the operation is conducted together with an automatical guidance (i.e., a guidance of the advancing direction in the first intersection automatically outputted without a demand from the operator when the motor vehicle approaches a point at a given distance (for example, 300 m) before the first intersection), as stated in the prior art example. However, in FIGS. 2 and 3, the concrete operation of the automatical guidance is omitted to be drawn for simplification.

As shown in FIG. 2, when detecting instructions from the inputting means 6 for demanding the output of the guidance information (step 101), the control means 10 checks whether or not it is within 10 seconds after the completion of the voice guidance outputted automatically when the motor vehicle approaches a point at a given distance (for example, 300 m) before the first intersection (step 102). If being within 10 seconds, the same voice guidance outputted at that time is again given to the voice outputting means 5 (step 103). In this case, the timer means 9 counts the 10 seconds and output the count result to the control means 10. When deciding the lapse of 10 seconds in the step 102, the position information of the motor vehicle is obtained (step 104), and the position of the first intersection is detected by using the route setting and storing means 7 (step 105).

The control means 10 calculates the distance from the position of the motor vehicle obtained in the step 104 to the first intersection on the drive route (step 106). Assuming that this distance is taken as X, a decision is made whether or not the calculated distance X is longer than 5100 m (step 107). If the calculated distance is longer than 5100 m, the control means 10 reads out the sound data "Along the road for a while" from the data storing means 2 (step 108) and makes the voice outputting means 4 output it (step 109). On the other hand, if in the step 107 the calculated distance X is less than 5100 m, the control means 10 detects the advancing direction in the first intersection on the basis of the drive route stored in the route setting and storing means 7 (step 110), and subsequently checks whether or not the calculated distance X is below 5100 m but equal to or more than 800 m (step 111). If 800 m≦calculated distance<5100 m in the step 111, the control means 10 gives the instructions to the enlarged view drawing means 8 to draw up an enlarged view of the first intersection, the enlarged view being indicated on the image display means 3 (step 112). In addition, the control means 10 reads out the sound data "About a kilometers ahead, b turn" from the data storing means 2 (step 113) and combines with this sound data the previously calculated distance X and the advancing direction in the intersection to output the composition to the speech synthesizing means 4 (step 114).

If in the step 111 the calculated distance X is below 800 m, the control means 10 checks to see if 45 m≦calculated distance X<800 m (step 115). If 45 m≦calculated distance X<800 m, the control means 10 gives the instructions to the enlarged view drawing means 8 to make an enlarged illustration of the first intersection, which is displayed on the image display means 3 (step 116). In addition, the control means 10 reads out the sound data "About a kilometers ahead, b turn" from the data storing means 2 (step 117) and combines with the previously calculated distance X and the advancing direction in the intersection to output the composition to the speech synthesizing means 4 (step 118).

If the answer of the step 115 is no 45 m≦calculated distance X<800 m, the control means 10 gives the instructions the enlarged view drawing means 8 to make the enlarged illustration of the first intersection and further makes the image display means 3 display the enlarged illustration (step 119). Further, the control means 10 reads out the sound data "A little ahead, b turn" from the data storing means 2 (step 120) and combines the previously detected advancing direction in the first intersection with the sound data and then supplies the composition to the speech synthesizing means 4 to output it from the voice outputting means 5 (step 121).

Figure 3:
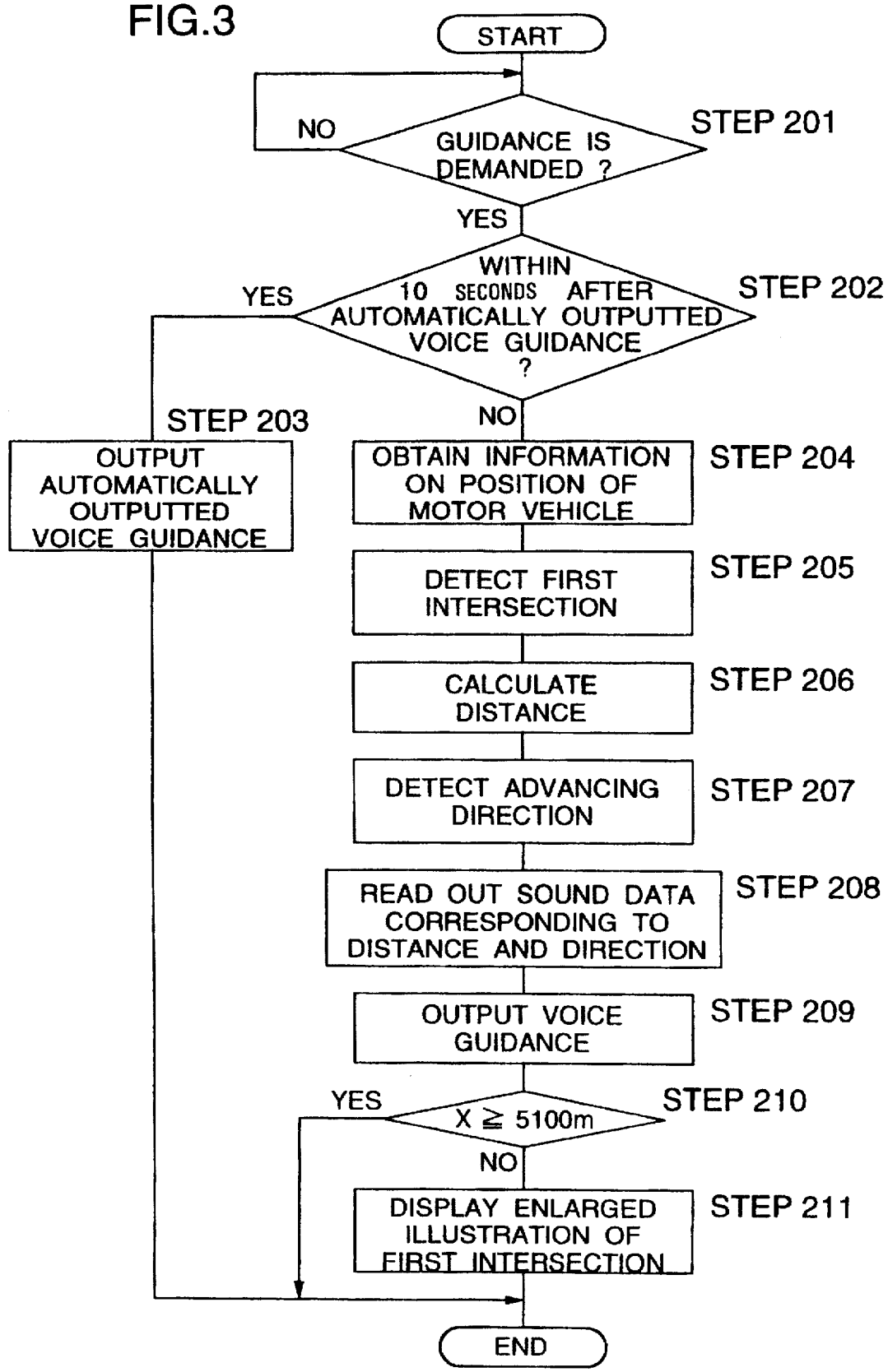
FIG. 3 is a flow chart showing an operation of a navigation system according to a second embodiment of this invention.

A description will be made hereinbelow of an example in which the sound data is not produced by adding the distance and direction information to the basic sound data as described above but different sound data are used in correspondence with the distance and the direction. FIG. 3 is a flow chart showing an operation of a navigation system according to a second embodiment of this invention. Further, FIGS. 4, 5, 6, 7 and 8 are illustrations of storage tables of sound data in the second embodiment of this invention. These sound data illustrated are stored in the data storing means 2.

In FIG. 3, steps 201 to 206 are the same as the operation shown in FIG. 2, and the description thereof will be omitted for simplicity. A step 207 is for detecting an advancing direction in the first intersection.

Secondly, the operation of a step 208 will be explained. In the step 208, the control means 10 retrieves, on the basis of the data number, a message corresponding to a distance X calculated in the step 206 and the advancing direction detected in the step 207, and then reads out it from the data storing means 2. For instance, when the calculated distance X is equal to or more than 5100 m, the control means 10 reads out the sound data "Along the road for a while" corresponding to the data number A-1. Further, if the distance is 1800 m and the advancing direction is right, the control means 10 reads out the sound data "About 2 kilometers ahead, right turn".

The sound data read out as mentioned above is synthesized to a sound signal in the speech synthesizing means 4 and then outputted from the voice outputting means 5 (step 209). In addition, the control means 10 checks if the calculated distance X is less than 5100 m, and if being less than 5100 m, makes the enlarged view drawing means 8 make the enlarged illustration of the first intersection and further lets the image displaying means 3 display it (step 211). Thus, now that all the messages corresponding to the distances and the advancing directions are stored in the large-capacity data storing means 2 such as CD-ROM, there is no need to combine plural kinds of messages.

With the process as shown in FIG. 2 or 3, the guidance information on the intersections can be outputted when the user demands it, whereas a detailed description will here be made hereinbelow of an operation of outputting an enlarged illustration of an intersection in FIG. 2 or 3.

Figure 9:
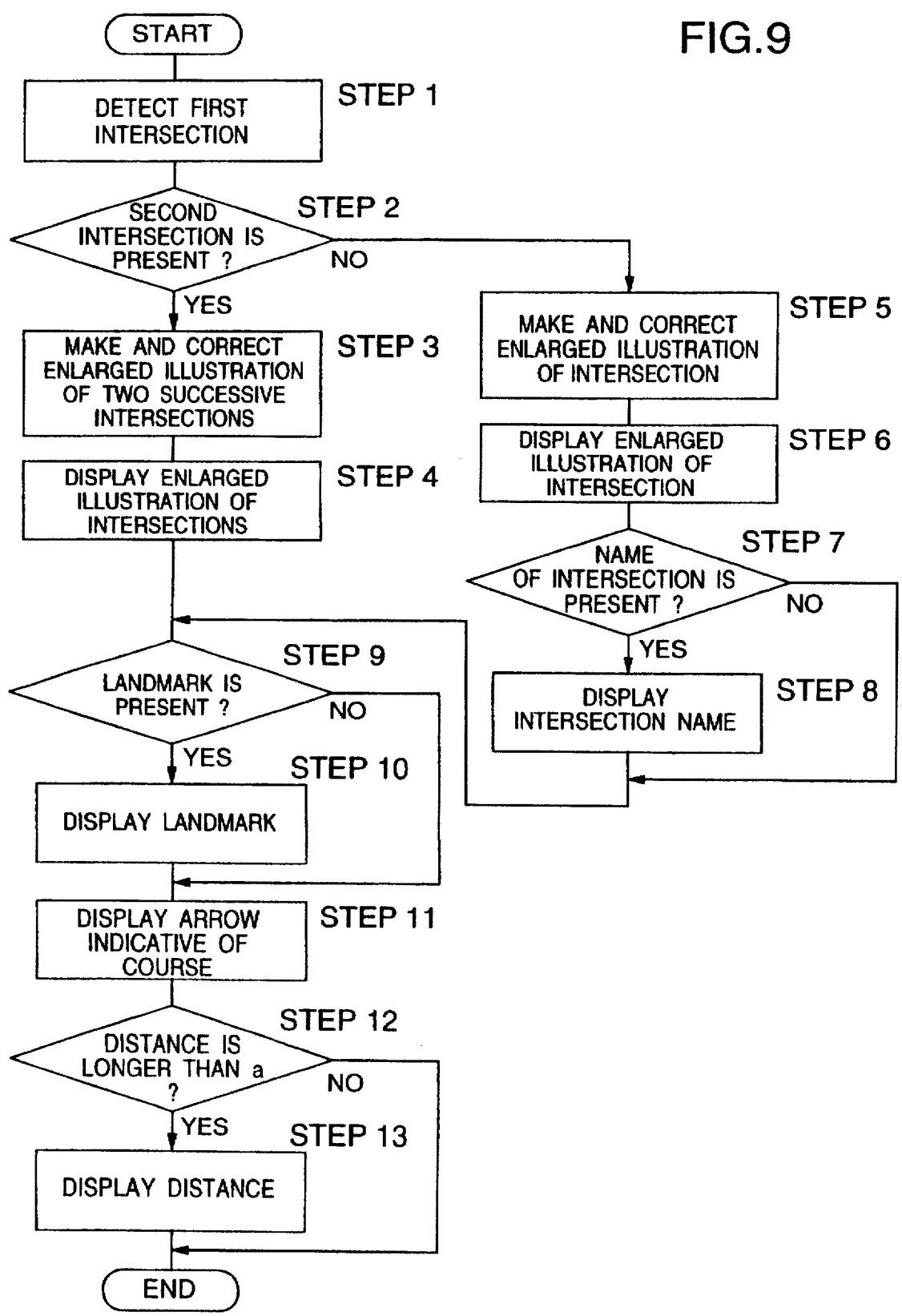
FIG. 9 is a flow chart showing an operation of outputting the enlarged illustration of the intersection in the navigation system according to the embodiment in FIG. 2 or 3 of this invention.

FIG. 9 is a flow chart showing an operation of outputting the enlarged illustration of the intersection in the navigation system according to the embodiment in FIG. 2 or 3 of this invention. In FIG. 9, when receiving an instruction from the inputting means 6 as described before or deciding, the fact that the motor vehicle reaches a point at a given distance (for example, 300 m) before the first intersection on the basis of the position information of the motor vehicle outputted from the position measuring means 1 and the drive route stored in the route setting and storing means 8, the control means 10 detects the first intersection on the road map data (step 1). The distance from the position of the motor vehicle to the first intersection is easily obtainable on the basis of position data on latitudes and longitudes corresponding to the road map data stored in the data storing means 2. Further, the control means 10 checks whether or not there is another intersection subsequent to the first intersection for change of the advancing direction (which will be referred hereinafter to as a second intersection) (step 2). In this case, the three conditions for deciding the presence of the second intersection following the first intersection are as follows. That is, 1) The distance between the first and second intersections is less than 280 m;

2) The road leading from the first intersection to the second intersection is straight; and 3) There is no intersection between the first and second intersections.

When deciding no second intersection in the step 2, on the basis of the information such as road situations and road meeting (crossing) angles of the intersection included in the road map data in the data storing means 2, the control means 10 makes the enlarged view drawing means 8 draw an enlarged illustration of image data in the road map data with respect to only the first intersection (step 5), and outputs the intersection enlarged illustration to the image display means 3 (step 6). Furthermore, the control means 10 checks to see if the data storing means 2 has the information on the name of the intersection (step 7) and, if present therein, outputs the enlarged illustration of the intersection and the name of the intersection to the image display means 3 (step 8).

On the other hand, when deciding the presence of the second intersection in the step 2, the control means 10 gives instructions to the enlarged view drawing means 8 to make the enlarged illustrations with respect to both the first and second intersections (step 3), respectively, and outputs the two enlarged illustrations to the image display means 3 (step 4).

After outputting the intersection enlarged illustration to the image display means 3, the control means 10 retrieves the landmark information in the data storing means 2 to check whether or not there is a landmark such as a gas station in the neighborhood of that intersection (step 9). If present, in addition to the intersection enlarged illustration the control means 10 outputs a mark representative of the landmark to the image display means 3 (step 10).

Figure 10:
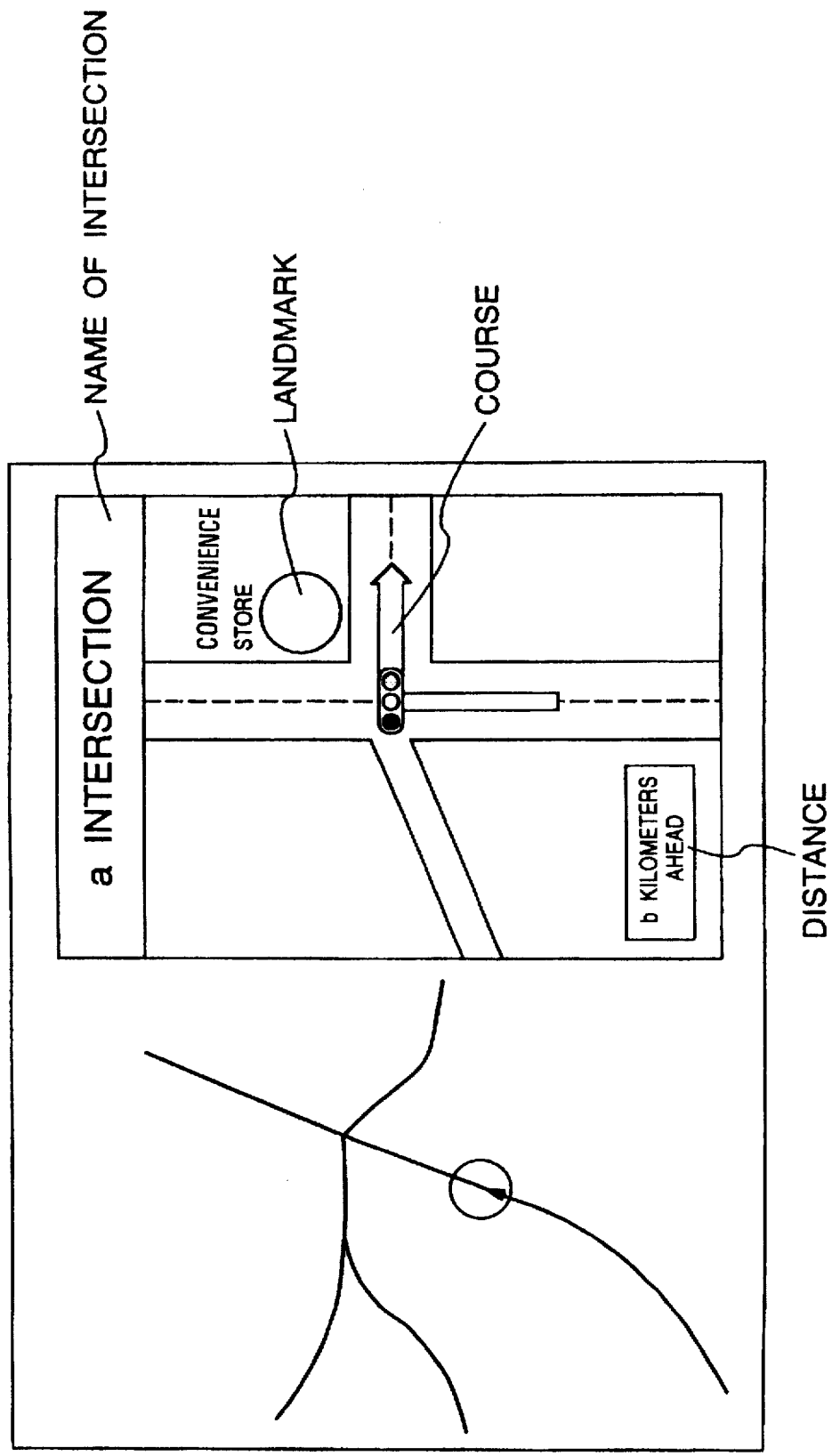
FIG. 10 illustrates one example of an enlarged illustration of an intersection according to the flow chart in FIG. 9.

Further, on the basis of the drive route stored in the route setting and storing means 8, the control means 10 displays, on the intersection enlarged illustration, the distance to that intersection and an arrow signifying the advancing direction of the motor vehicle at that intersection (step 11). If the distance up to the first intersection is longer than a predetermined distance (step 12), the control means 10 also indicates the distance (step 13). FIG. 10 shows an indication example of the enlarged illustration of the intersection according to the operation in FIG. 9.

A description will be made of an operation of making an enlarged illustration of an intersection in the enlarged view drawing means 8. FIGS. 11, 12, 13 and 14 are illustrations for explaining an enlargement of two types of intersections according to the operation in FIG. 9, showing the method of making the intersection enlarged illustration in the enlarged view drawing means 8 which is taken in the steps 3 and 5 in FIG. 9.

The road map data stored in the data storing means 2 includes the information on the widths of the roads (which will be referred hereinafter to as road width information) and the road crossing angle information (which will be referred hereinafter to as crossing information), and the enlarged view drawing means 8 classifies the intersections into three sections in accordance with the road widths on the basis of the road width information on the roads constituting the intersections. The road widths are called width 3, with 2 and width 1 in order of enlargement of the road widths.

Figure 11:
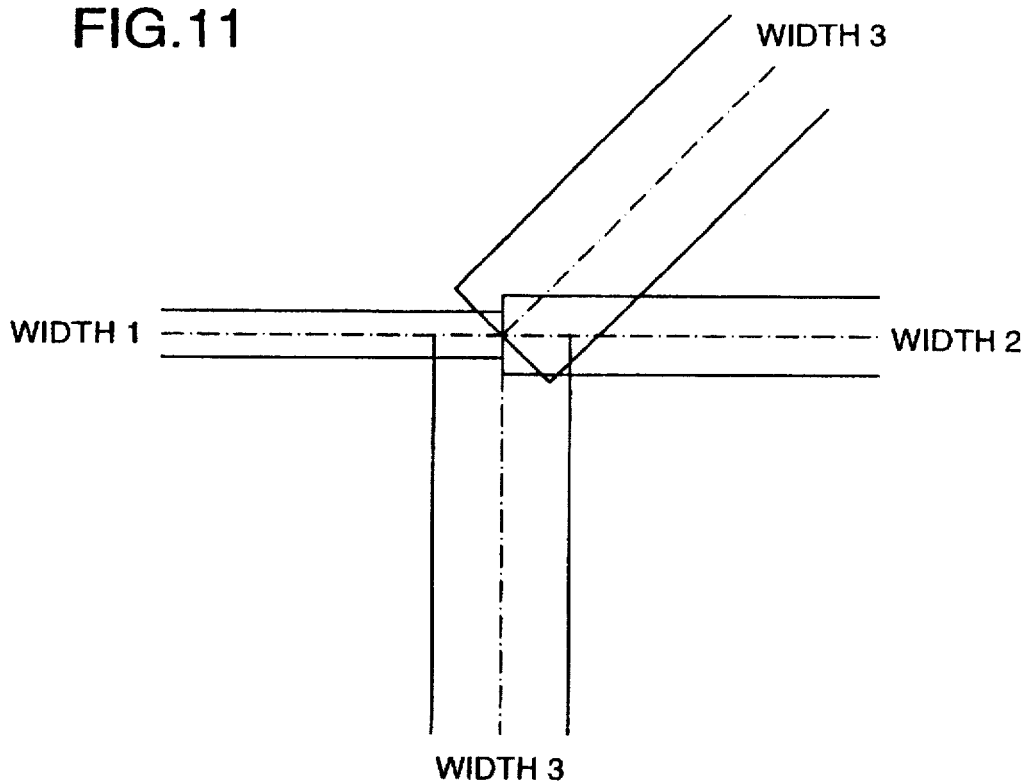
FIG. 11 is an enlarged explanatory illustration of an intersection according to the flow chart in FIG. 9.
Figure 12:
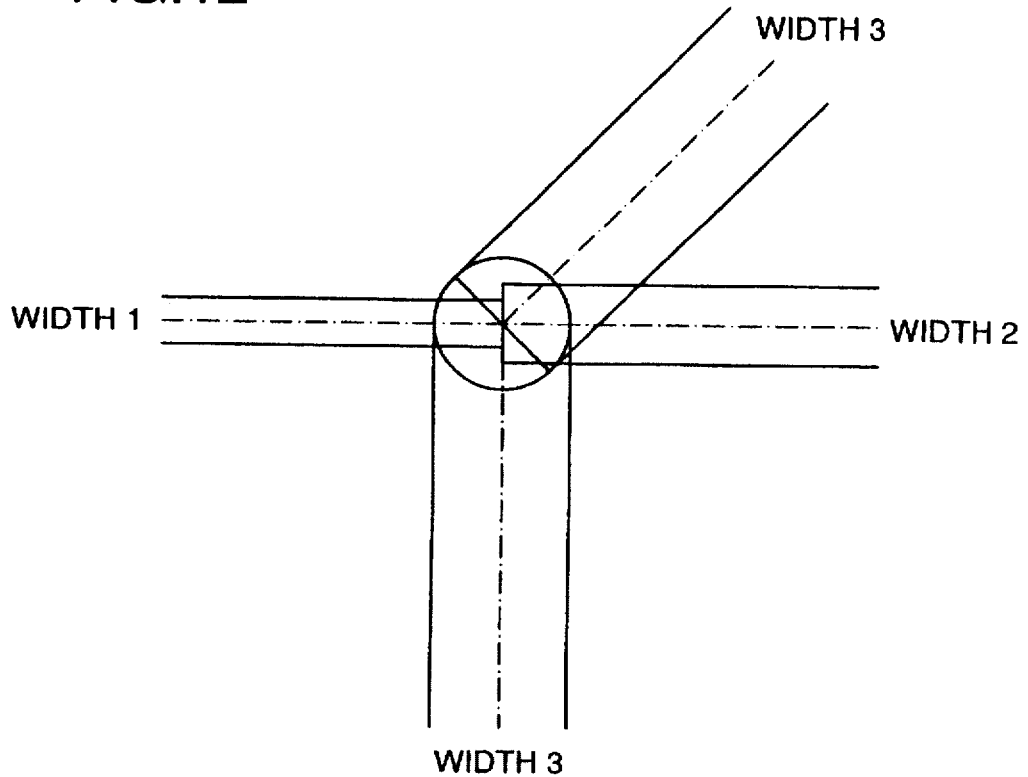
FIG. 12 is an enlarged explanatory illustration of an intersection in FIG. 11.

A description will be taken of a method of making an enlarged illustration in the case that two or more of the roads organizing the intersection are classified as the largest width 3, as shown in FIGS. 11, 12. As shown in FIG. 11, the enlarged view drawing means 8 indicates all the roads constituting the intersection as rectangles which signifies the road widths as short sides, and makes a drawing on the basis of the crossing information in such a manner that the middle points of the short sides coincide with the center point of the intersection. As shown in FIG. 12, the enlarged illustration can be completed with the correction made by drawing a circle with respect to the center of the intersection, of which circle the diameter becomes equal to the largest width 3.

Figure 13:
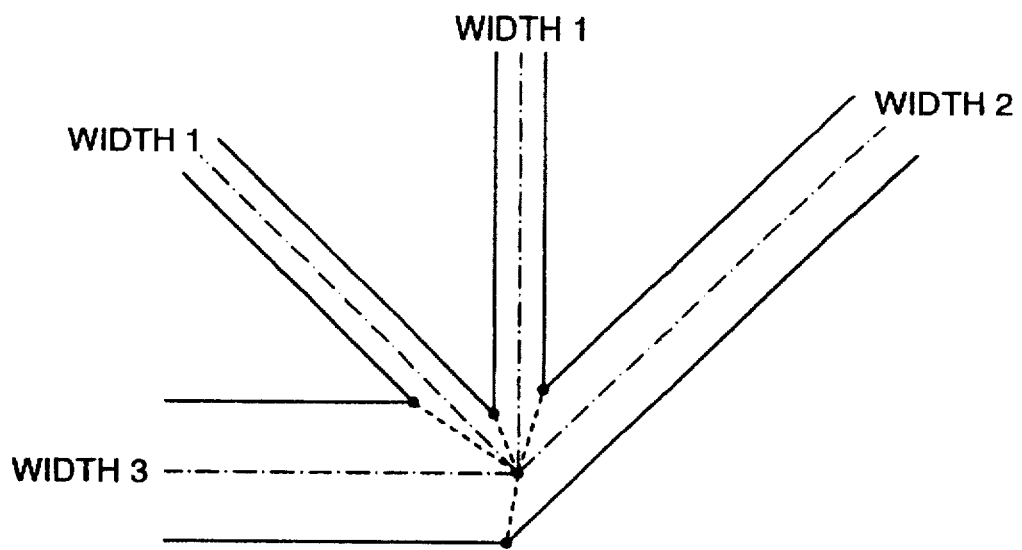
FIG. 13 is an enlarged explanatory illustration of an intersection according to the flow chart in FIG. 9.
Figure 14:
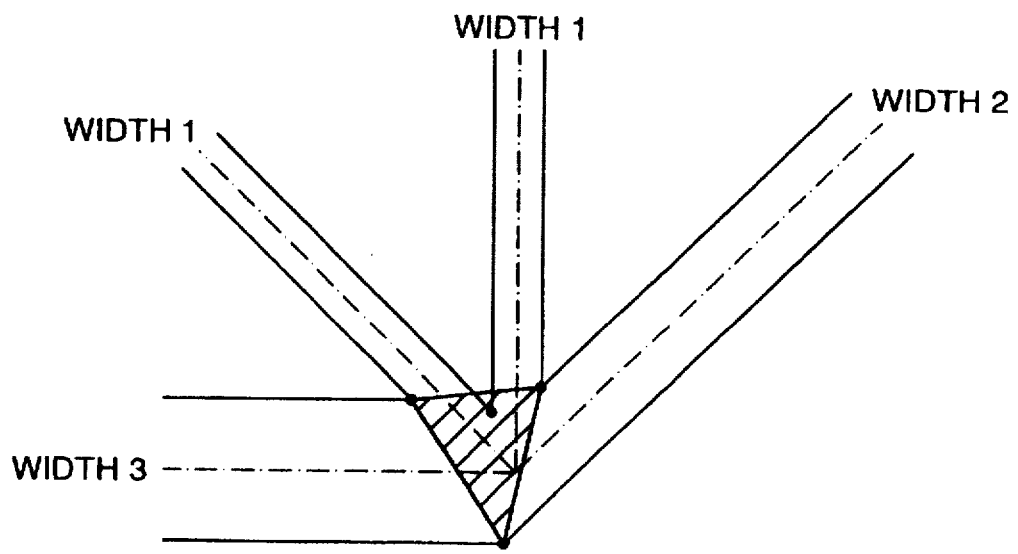
FIG. 14 is an enlarged explanatory illustration of the intersection in FIG. 13.

Furthermore, a description will be made of another method of making an enlarged illustration in the case of the presence of only one largest width 3 road, as shown in FIGS. 13, 14. As shown in FIG. 13, each of the roads constituting the intersection is drawn as a pentagon where the center point of the intersection and the crossing points between the adjacent roads are included as vertexes. In this case, a notch may be put in the intersection as shown in FIG. 13. For this reason, following the foregoing process, as shown in FIG. 14, for correction and completion of the illustration a projected polygon is drawn so that the crossing points among the roads are taken to be vertexes.

Moreover, in the production of the aforesaid enlarged illustration, when the crossing angle between the adjacent roads is below 20 degrees, there is a possibility that the roads come into contact with each other in the enlarged illustration. For eliminating this problem, an enlarged illustration of the intersection is made which is deformed until the crossing angle reaches 20 degrees.

The production of the intersection enlarged illustration is not limited to the above-described methods, and it is also possible that the enlarged illustrations of the principal intersections are stored as image data in the data storing means 2 and read out when necessary.

As described above, according to the present invention, at a certain motor vehicle position where the driver demands the voice guidance, the voice guidance is made in correspondence with the distance to the intersection at which the motor vehicle is to turn next and the advancing direction in the intersection. Accordingly, the driver can beforehand realize the intersection at which the motor vehicle is to change its advancing direction, thus eliminating the driver's uneasy feeling. In addition, when the motor vehicle comes into within a certain distance of range before the intersection at which the motor vehicle is to turn next, the enlarged illustration of the intersection appears on the image display means 3 so that the guidance is made with an image and a speech, thus offering further effects.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A navigation system comprising:
    position measuring means for measuring a position of a motor vehicle;
    map storing means for storing road map data;
    image display means for indicating an image signal including said road map data;
    sound storing means for storing guidance information on intersections as sound data;
    speech synthesizing means for performing a speech synthesizing process for said sound data to output a sound signal;
    voice outputting means for outputting as a voice said sound signal from said speech synthesizing means;
    inputting means for inputting various kinds of data from a user;
    route setting means for setting a drive route on said road map data on the basis of starting point information and destination information inputted through said inputting means;
    route storing means for storing said drive route set by said route setting means; and
    control means for, when from said inputting means demanding output of guidance information on a first intersection on a drive route for next change of its advancing direction while said motor vehicle is running according to said drive route stored in said route storing means, retrieving said first intersection on the basis of said drive route to read out sound data corresponding to the retrieved result from said sound storing means and output the read sound data to said speech synthesizing means.

2. A navigation system as defined in claim 1, further comprising enlarged view drawing means for making an enlarged illustration of an intersection on the basis of said road map data, said control means outputting said sound data from said sound storing means to said speech synthesizing means and further giving instructions to said enlarged view drawing means to produce enlarged view illustration data of said first intersection, and outputting the produced enlarged view illustration data from said enlarged view drawing means to said image display means.

3. A navigation system as defined in claim 2, wherein said enlarged view illustration data of said first intersection includes a distance from the position of said motor vehicle to said first intersection.

4. A navigation system as defined in claim 2, wherein said enlarged view illustration data of said first intersection includes an advancing direction in said first intersection.

5. A navigation system as defined in claim 1, further comprising enlarged view storing means for storing an enlarged illustration of an intersection, said control means outputting said sound data from said sound storing means to said speech synthesizing means and further reading out enlarged illustration data of said first intersection from said enlarged view storing means and output the read enlarged illustration data to said image display means.

6. A navigation system as defined in claim 5, wherein said enlarged illustration data of said first intersection includes a distance from the position of said motor vehicle to said first intersection.

7. A navigation system as defined in claim 5, wherein said enlarged illustration data of said first intersection includes an advancing direction in said first intersection.

8. A navigation system as defined in claim 1, wherein said inputting means recognizes a voice of a user for inputting data.

9. A navigation system comprising:
position measuring means for measuring a position of a motor vehicle;
map storing means for storing road map data;
image display means for indicating an image signal including said road map data;
sound storing means for storing guidance information on intersections as sound data;
speech synthesizing means for performing a speech synthesizing process for said sound data to output a sound signal;
voice outputting means for outputting as a voice said sound signal from said speech synthesizing means;
inputting means for inputting various kinds of data from a user;
route setting means for setting a drive route on said road map data on the basis of starting point information and destination information inputted through said inputting means;
route storing means for storing said drive route set by said route setting means; and
control means for, when from said inputting means demanding output of guidance information on a first intersection on the drive route for next change of its advancing direction while said motor vehicle is running according to said drive route stored in said route storing means, retrieving said first intersection on the basis of said drive route, and obtaining a distance from said position of said motor vehicle to said first intersection on the basis of said road map data and further obtaining the advancing direction in said first intersection on the basis of said drive route to read out sound data corresponding to the obtained distance and advancing direction from said sound storing means and output the read sound data to said speech synthesizing means.

10. A navigation system as defined in claim 9, further comprising enlarged view drawing means for making an enlarged illustration of an intersection on the basis of said road map data, said control means outputting said sound data from said sound storing means to said speech synthesizing means and further giving instructions to said enlarged view drawing means to produce enlarged view illustration data of said first intersection, and outputting the produced enlarged view illustration data from said enlarged view drawing means to said image display means.

11. A navigation system as defined in claim 10, wherein said enlarged view illustration data of said first intersection includes a distance from the position of said motor vehicle to said first intersection.

12. A navigation system as defined in claim 10, wherein said enlarged view illustration data of said first intersection includes an advancing direction in said first intersection.

13. A navigation system as defined in claim 9, further comprising enlarged view storing means for storing an enlarged illustration of an intersection, said control means outputting said sound data from said sound storing means to said speech synthesizing means and further reading out enlarged illustration data of said first intersection from said enlarged view storing means and output the read enlarged illustration data to said image display means.

14. A navigation system as defined in claim 13, wherein said enlarged illustration data of said first intersection includes a distance from the position of said motor vehicle to said first intersection.

15. A navigation system as defined in claim 13, wherein said enlarged illustration data of said first intersection includes an advancing direction in said first intersection.

16. A navigation system as defined in claim 9, wherein said inputting means recognizes a voice of a user for inputting data.

17. A navigation system comprising:
position measuring means for measuring a position of a motor vehicle;
map storing means for storing road map data;
image display means for indicating an image signal including said road map data;
sound storing means for storing guidance information on intersections as sound data;
speech synthesizing means for performing a speech synthesizing process for said sound data to output a sound signal;
voice outputting means for outputting as a voice said sound signal from said speech synthesizing means;
inputting means for inputting various kinds of data from a user;
route setting means for setting a drive route on said road map data on the basis of starting point information and destination information inputted through said inputting means;
route storing means for storing said drive route set by said route setting means; and
control means for, when from said inputting means demanding output of guidance information on a first intersection on the drive route for next change of its advancing direction while said motor vehicle is running according to said drive route stored in said route storing means, retrieving said first intersection on the basis of said drive route, and obtaining a distance from said position of said motor vehicle to said first intersection on the basis of said road map data to read out sound data corresponding to the obtained distance from said sound storing means and output the read sound data to said speech synthesizing means.

18. A navigation system as defined in claim 17, further comprising enlarged view drawing means for making an enlarged illustration of an intersection on the basis of said road map data, said control means outputting said sound data from said sound storing means to said speech synthesizing means and further giving instructions to said enlarged view drawing means to produce enlarged view illustration data of said first intersection, and outputting the produced enlarged view illustration data from said enlarged view drawing means to said image display means.

19. A navigation system as defined in claim 18, wherein said enlarged view illustration data of said first intersection includes a distance from the position of said motor vehicle to said first intersection.

20. A navigation system as defined in claim 18, wherein said enlarged view illustration data of said first intersection includes an advancing direction in said first intersection.

21. A navigation system as defined in claim 17, further comprising enlarged view storing means for storing an enlarged illustration of an intersection, said control means outputting said sound data from said sound storing means to said speech synthesizing means and further reading out enlarged illustration data of said first intersection from said enlarged view storing means and output the read enlarged illustration data to said image display means.

22. A navigation system as defined in claim 21, wherein said enlarged illustration data of said first intersection includes a distance from the position of said motor vehicle to said first intersection.

23. A navigation system as defined in claim 21, wherein said enlarged illustration data of said first intersection includes an advancing direction in said first intersection.

24. A navigation system as defined in claim 17, wherein said inputting means recognizes a voice of a user for inputting data.

25. A navigation system comprising:

position measuring means for measuring a position of a motor vehicle;

map storing means for storing road map data;

image display means for indicating an image signal including said road map data;

sound storing means for storing guidance information on intersections as sound data;

speech synthesizing means for performing a speech synthesizing process for said sound data to output a sound signal;

voice outputting means for outputting as a voice said sound signal from said speech synthesizing means;

inputting means for inputting various kinds of data from a user;

route setting means for setting a drive route on said road map data on the basis of starting point information and destination information inputted through said inputting means;

route storing means for storing said drive route set by said route setting means; and control means for, when from said inputting means demanding output of guidance information on a first intersection on a drive route for next change of its advancing direction while said motor vehicle is running according to said drive route stored in said route storing means, retrieving said first intersection on the basis of said drive route to obtain the advancing direction in said first intersection to read out sound data corresponding to the obtained advancing direction from said sound storing means to output the read sound data to said speech synthesizing means.

26. A navigation system as defined in claim 25, further comprising enlarged view drawing means for making an enlarged illustration of an intersection on the basis of said road map data, said control means outputting said sound data from said sound storing means to said speech synthesizing means and further giving instructions to said enlarged view drawing means to produce enlarged view illustration data of said first intersection, and outputting the produced enlarged view illustration data from said enlarged view drawing means to said image display means.

27. A navigation system as defined in claim 26, wherein said enlarged view illustration data of said first intersection includes a distance from the position of said motor vehicle to said first intersection.

28. A navigation system as defined in claim 26, wherein said enlarged view illustration data of said first intersection includes an advancing direction in said first intersection.

29. A navigation system as defined in claim 25, further comprising enlarged view storing means for storing an enlarged illustration of an intersection, said control means outputting said sound data from said sound storing means to said speech synthesizing means and further reading out enlarged illustration data of said first intersection from said enlarged view storing means and output the read enlarged illustration data to said image display means.

30. A navigation system as defined in claim 29, wherein said enlarged illustration data of said first intersection includes a distance from the position of said motor vehicle to said first intersection.

31. A navigation system as defined in claim 29, wherein said enlarged illustration data of said first intersection includes an advancing direction in said first intersection.

32. A navigation system as defined in claim 25, wherein said inputting means recognizes a voice of a user for inputting data.

33. A navigation system comprising:

position measuring means for measuring a position of a motor vehicle;

map storing means for storing road map data;

image display means for indicating an image signal including said road map data;

enlarged view drawing means for producing enlarged illustration data of an intersection on the basis of said road map data;

inputting means for inputting various kinds of data from a user;

route setting means for setting a drive route on said road map data on the basis of starting point information and destination information inputted through said inputting means;

route storing means for storing said drive route set by said route setting means; and control means for, when from said inputting means demanding output of guidance information on a first intersection on the drive route for next change of its advancing direction while said motor vehicle is running according to said drive route stored in said route storing means, retrieving said first intersection on the basis of said drive route and for giving instructions to said enlarged view drawing means to produce enlarged illustration data of said first intersection, and further for outputting the produced enlarged illustration data from said enlarged view drawing means to said image display means.

34. A navigation system as defined in claim 33, wherein said control means obtains a distance from the position of said motor vehicle to said first intersection on the basis of said road map data, and said enlarged illustration data of said first intersection includes said distance from the position of said motor vehicle to said first intersection.

35. A navigation system as defined in claim 33, wherein said control means obtains the advancing direction in said first intersection on the basis of said drive route, and said enlarged illustration data of said first intersection includes a course from said first intersection.

36. A navigation system as defined in claim 33, wherein said inputting means inputs data by recognizing a voice of the user.

37. A navigation system comprising:

position measuring means for measuring a position of a motor vehicle;

map storing means for storing road map data;

image display means for indicating an image signal including said road map data;

enlarged view storing means for storing enlarged illustration data of an intersection;

inputting means for inputting various kinds of data from a user;

route setting means for setting a drive route on said road map data on the basis of starting point information and destination information inputted through said inputting means;

route storing means for storing said drive route set by said route setting means; and control means for, when from said inputting means demanding output of guidance information on a first intersection on a drive route for next change of its advancing direction while said motor vehicle is running according to said drive route stored in said route storing means, retrieving said first intersection on the basis of said drive route and for reading out enlarged illustration data of said first intersection from said enlarged view storing means to output the read enlarged illustration data to said image display means.

38. A navigation system as defined in claim 37, wherein said control means obtains a distance from the position of said motor vehicle to said first intersection on the basis of said road map data, and said enlarged illustration data of said first intersection includes said distance from the position of said motor vehicle to said first intersection.

39. A navigation system as defined in claim 37, wherein said control means obtains the advancing direction in said first intersection on the basis of said drive route, and said enlarged illustration data of said first intersection includes a course from said first intersection.

40. A navigation system as defined in claim 37, wherein said inputting means inputs data by recognizing a voice of the user.

41. An intersection guidance method which displays a measured position of a motor vehicle on road map data and outputs guidance information on an intersection when said motor vehicle runs according to a set drive route, said method comprising:

a first step of checking whether or not there is a demand of output of guidance information on a first intersection on said drive route at which said motor vehicle next changes its advancing direction;

a second step of obtaining information on a position of said motor vehicle;

a third step of obtaining information on a position of said first intersection;

a fourth step of calculating a distance from the position of said motor vehicle obtained in the second step from the position of said first intersection obtained in the third step;

a fifth step of obtaining the advancing direction in said first intersection on the basis of said drive route; and a sixth step of outputting as a voice the distance from the position of said motor vehicle to the position of said first intersection obtained in the fourth step and the advancing direction in first intersection obtained in the fifth step.

42. An intersection guidance method which displays a measured position of a motor vehicle on road map data and outputs guidance information on an intersection when said motor vehicle runs according to a set drive route, said method comprising:

a first step of checking whether or not there is a demand of output of guidance information on a first intersection on said drive route at which said motor vehicle next changes its advancing direction;

a second step of obtaining information on a position of said motor vehicle;

a third step of obtaining information on a position of said first intersection;

a fourth step of calculating a distance from the position of said motor vehicle obtained in the second step from the position of said first intersection obtained in the third step; and a fifth step of outputting as a voice the distance from the position of said motor vehicle to the position of said first intersection obtained in the fourth step.

43. An intersection guidance method which displays a measured position of a motor vehicle on road map data and outputs guidance information on an intersection when said motor vehicle runs according to a set drive route, said method comprising:

a first step of checking whether or not there is a demand of output of guidance information on a first intersection on said drive route at which said motor vehicle next changes its advancing direction;

a second step of obtaining information on a position of said motor vehicle;

a third step of obtaining information on a position of said first intersection;

a fourth step of obtaining the advancing direction in said first intersection on the basis of said drive route; and a fifth step of outputting as a voice the advancing direction in said first intersection obtained in the fourth step.

44. An intersection guidance method which displays a measured position of a motor vehicle on road map data and outputs guidance information on an intersection when said motor vehicle runs according to a set drive route, said method comprising:

a first step of checking whether or not there is a demand of output of guidance information on a first intersection on said drive route at which said motor vehicle next changes its advancing direction;

a second step of obtaining information on a position of said motor vehicle;

a third step of obtaining information on a position of said first intersection;

a fourth step of calculating a distance from the position of said motor vehicle obtained in the second step to the position of said first intersection obtained in the third step;

a fifth step of obtaining the advancing direction in said first intersection on the basis of said drive route; and a sixth step of outputting an enlarged illustration of said first intersection including the distance from the position of said motor vehicle to the position of said first intersection obtained in the fourth step and the advancing direction in said first intersection obtained in the fifth step.

45. An intersection guidance method which displays a measured position of a motor vehicle on road map data and outputs guidance information on an intersection when said motor vehicle runs according to a set drive route, said method comprising:

a first step of checking whether or not there is a demand of output of guidance information on a first intersection on said drive route at which said motor vehicle next changes its advancing direction;

a second step of obtaining information on a position of said motor vehicle;

a third step of obtaining information on a position of said first intersection;

a fourth step of calculating a distance from the position of said motor vehicle obtained in the second step to the position of said first intersection obtained in the third step; and a fifth step of outputting an enlarged illustration of said first intersection including the distance from the position of said motor vehicle to the position of said first intersection obtained in the fourth step.

46. An intersection guidance method which displays a measured position of a motor vehicle on road map data and outputs guidance information on an intersection when said motor vehicle runs according to a set drive route, said method comprising:

a first step of checking whether or not there is a demand of output of guidance information on a first intersection on said drive route at which said motor vehicle next changes its advancing direction;

a second step of obtaining information on a position of said motor vehicle;

a third step of obtaining information on a position of said first intersection;

a fourth step of obtaining the advancing direction in said first intersection on the basis of said drive route; and a fifth step of outputting an enlarged illustration of said first intersection including the advancing direction in said first intersection obtained in the fourth step.

* * * * *